(12) United States Patent  
Hou et al.

(10) Patent No.: US 10,429,254 B2  
(45) Date of Patent: Oct. 1, 2019

(54) PIEZO FORCE SENSOR WITH SOLID-STATE BONDING SPACER

(71) Applicant: UNIVERSAL CEMENT CORPORATION, Taipei (TW)

(72) Inventors: Chih-Sheng Hou, Taipei (TW); Chia-Hung Chou, Taipei (TW)

(73) Assignee: UNIVERSAL CEMENT CORPORATION, Taipei (TW)

(*) Notice: Subject to any disclaimer, the term of this patent is extended or adjusted under 35 U.S.C. 154(b) by 96 days.

(21) Appl. No.: 15/499,575

(22) Filed: Apr. 27, 2017

(65) Prior Publication Data

US 2018/0313703 A1 Nov. 1, 2018

(51) Int. Cl.
| | |
|---|---|
| *G01L 1/16* | (2006.01) |
| *G01L 1/14* | (2006.01) |
| *G01L 1/18* | (2006.01) |
| *C09J 163/00* | (2006.01) |
| *C09J 175/00* | (2006.01) |
| *C09J 7/35* | (2018.01) |
| *C09J 7/38* | (2018.01) |

(52) U.S. Cl.
CPC .... *G01L 1/16* (2013.01); *C09J 7/35* (2018.01); *C09J 7/381* (2018.01); *C09J 7/385* (2018.01); *C09J 163/00* (2013.01); *C09J 175/00* (2013.01); *G01L 1/14* (2013.01); *G01L 1/18* (2013.01)

(58) Field of Classification Search
USPC ................................................ 73/862.625
See application file for complete search history.

(56) References Cited

U.S. PATENT DOCUMENTS

| | | | | |
|---|---|---|---|---|
| 4,584,625 A * | 4/1986 | Kellogg | ........... | B25J 13/084 |
| | | | | 361/283.1 |
| 4,801,838 A * | 1/1989 | Beauducel | ........... | G01V 1/20 |
| | | | | 310/319 |
| 5,191,791 A * | 3/1993 | Gerardi | ........... | B64D 15/16 |
| | | | | 73/178 R |
| 5,889,352 A * | 3/1999 | Takeuchi | ........... | G01L 9/008 |
| | | | | 310/324 |
| 6,483,055 B1 * | 11/2002 | Tanabe | ........... | H01H 3/141 |
| | | | | 200/512 |
| 7,533,582 B2 * | 5/2009 | Okada | ........... | G01L 1/144 |
| | | | | 73/862.043 |

(Continued)

OTHER PUBLICATIONS

Freitas et al. ("Test Method to Assess Interface Adhesion in Composite Bonding", Applied Adhesion Science) (Year: 2015).*

*Primary Examiner* — Nathaniel T Woodward  
(74) *Attorney, Agent, or Firm* — Hauptman Ham, LLP (57) ABSTRACT

A fast response force sensor is disclosed. The fast response force sensor comprises a solid-state bonding (SSB) spacer and piezo material therein. The SSB spacer is sandwiched between a top stack and a bottom stack of the force sensor. The SSB spacer maintains a fixed relative position between a top stack and a bottom stack of the force sensor when a fixed force is applied or removed. The SSB spacer is in solid state and shall not be significantly deformed while being depressed by a user, and therefore the response time of an output signal is vastly determined by the properties of the piezo material of the force sensor when a force is applied against the force sensor. Therefore, a fast response force sensor can respond quickly to a force applied against it.

28 Claims, 12 Drawing Sheets

(56) References Cited

U.S. PATENT DOCUMENTS

| | | | | |
|---|---|---|---|---|
| 7,997,144 B1* | 8/2011 | Pekarek | ............. | G01L 1/16 |
| | | | | 73/777 |
| 8,018,301 B2* | 9/2011 | Huang | ............. | H03H 3/0072 |
| | | | | 333/186 |
| 8,434,369 B2* | 5/2013 | Hou | ............. | G06F 3/0414 |
| | | | | 361/600 |
| 2004/0000195 A1* | 1/2004 | Yanai | ............. | A61B 5/113 |
| | | | | 73/717 |
| 2005/0128047 A1* | 6/2005 | Watanabe | ............. | H01C 10/106 |
| | | | | 338/47 |
| 2012/0305378 A1* | 12/2012 | Hou | ............. | H01H 13/785 |
| | | | | 200/534 |
| 2013/0249859 A1* | 9/2013 | Park | ............. | G06F 3/044 |
| | | | | 345/174 |
| 2015/0020585 A1* | 1/2015 | Dussinger | ............. | B60C 23/0411 |
| | | | | 73/146.5 |
| 2017/0292887 A1* | 10/2017 | Schmidt | ............. | G01L 9/0044 |
| 2017/0328702 A1* | 11/2017 | Vossough | ............. | G01P 15/0802 |
| 2018/0086628 A1* | 3/2018 | Vossough | ............. | H04R 19/005 |

* cited by examiner

PIEZO FORCE SENSOR WITH SOLID-STATE BONDING SPACER

BACKGROUND

Technical Field

The present invention relates to a force sensor, especially relates to a force sensor having a solid-state bonding (SSB) spacer between a top stack and a bottom stack of the force sensor.

Description of Related Art

FIGS. 1A-1B, 2 and 3A-3B show a prior art.

Figure 1A:
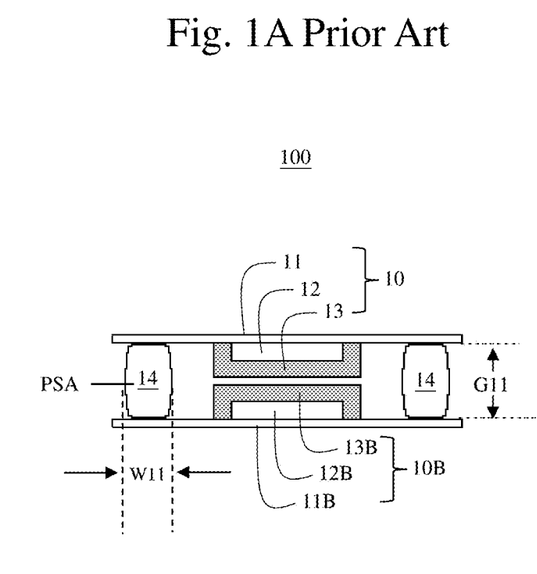
FIGS. 1A-1B, 2 and 3A-3B show a prior art.

FIG. 1A shows a prior art force sensor 100 in a status before being depressed.

FIG. 1A shows a force sensor 100 which comprises a top stack 10, a pressure sensitive adhesive (PSA) spacer 14, and a bottom stack 10B. The PSA spacer 14 is sandwiched between the top stack 10 and the bottom stack 10B. The PSA spacer 14 maintains a fixed space between the top stack 10 and the bottom stack 10B. The PSA spacer 14 has a height G11 and a width W11 in a section view before being depressed.

Figure 1B:
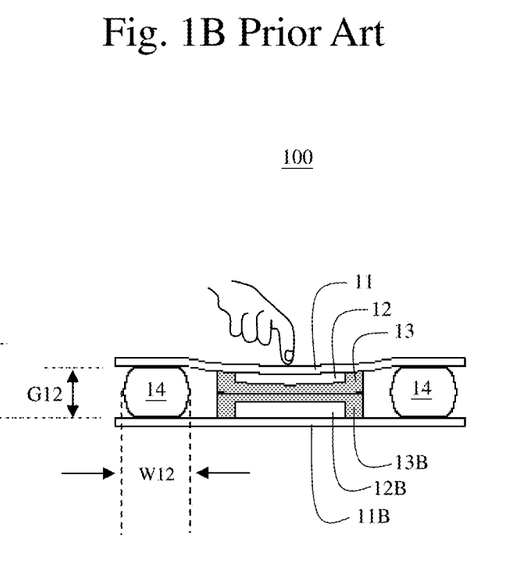

FIG. 1B shows the prior art force sensor 100 in a status after being depressed.

FIG. 1B shows while the force sensor 100 is depressed, PSA spacer 14 changes its dimension to a height G12 and a width W12 in a section view. The height G12 is smaller than the original height G11 and the width W12 is wider than the original width W11. This is because the PSA is viscoelastic which is flowable and sticky. When the force sensor 100 is depressed, the PSA spacer 14 is influenced and deformed downward slowly. The deformation of the PSA spacer 14 influences the deformation of the piezo material 13 and causes depression signal stabilization delay. Similarly, while the force sensor 100 is released, the restoration of the PSA spacer 14 affects the restoration of the piezo material 13 and causes restoration signal stabilization delay.

The disadvantage for the prior art is actuation signal stabilization delay when the force sensor 100 is depressed with a constant force, and the restoration signal stabilization is also delayed after the force sensor 100 is released. A quick response force sensor needs to be developed for accelerating the response speed to accurately measure a correct force signal.

Figure 2:
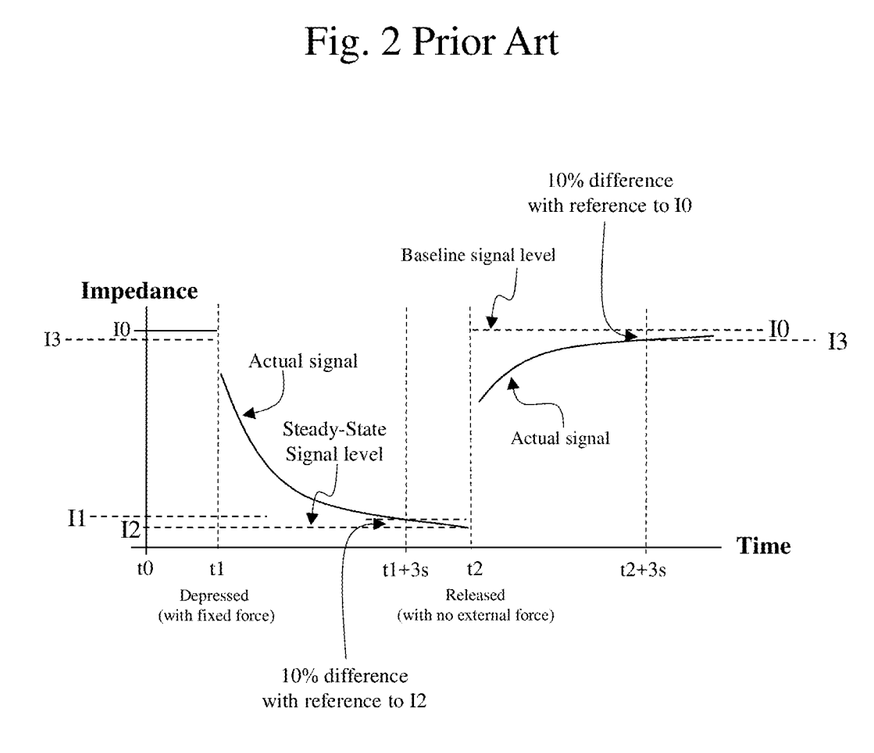

FIG. 2 shows a graph of Impedance vs Time for the prior art.

FIG. 2 shows an impedance I0 for a baseline signal level at time t0 for the force sensor 100 when the force sensor 100 is in standby. The force sensor 100 is depressed at time t1 with a constant force, and the impedance goes down towards Impedance I2 for a steady-state signal level. The actual signal goes down to I1 at time t1+3 s where impedance I1 is within 10% of impedance I2.

The 10% difference is calculated as follows:

$ABS(I1-I2)/I2 \leq 10\%$; wherein

ABS: absolute value.

I1: Impedance for actual signal.

I2: Impedance for the steady-state signal level for a fixed force.

The force sensor 100 is released at time t2, the impedance goes up approaches the baseline signal level I0. The actual impedance signal reaches I3 at time t2+3 s where impedance I3 is within 10% of impedance I0 for the baseline signal level.

The 10% difference is calculated as follows:

$ABS(I0-I3)/I0 \leq 10\%$; wherein

I3: Impedance for actual signal.

I0: Impedance for the baseline signal level.

It shows a force signal delay at least 3 second before the force signal being stable.

Figure 3A:
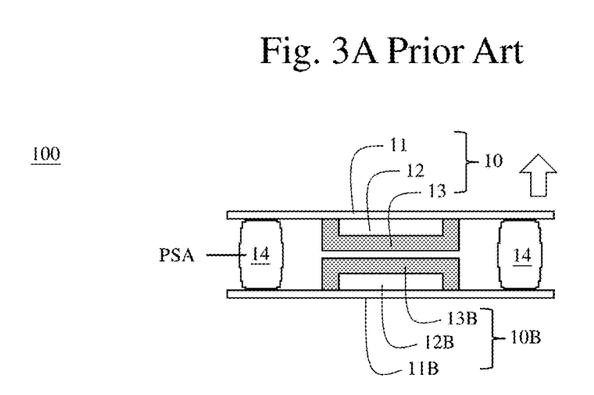
Figure 3B:
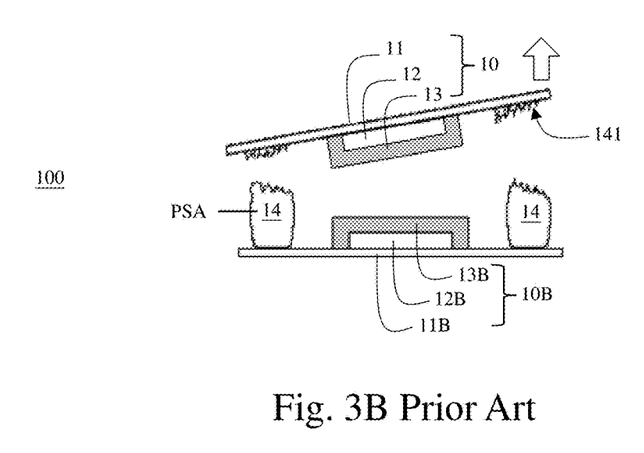

FIGS. 3A-3B show a peeling test for the prior art.

FIG. 3A shows the prior art before the peeling test.

FIG. 3A is the same as FIG. 1A which shows the force sensor 100 before peeling test being applied. A force sensor 100 is secured from bottom side and an upward peeling force is applied on the top substrate 11.

FIG. 3B shows the prior art after the peeling test.

FIG. 3B shows the PSA spacer 14 is torn apart and residues 141 of the PSA spacer 14 remains on a bottom surface of the top substrate 11 since the PSA spacer 14 is viscoelastic which has a cohesive force smaller than an adhesive force.

BRIEF DESCRIPTION OF THE DRAWINGS

FIGS. 7A-8B show different positions for the SSB spacer according to the present invention.

DETAILED DESCRIPTION OF THE INVENTION

A fast response force sensor is disclosed. The force sensor utilizes a solid-state bonding (SSB) spacer. The SSB spacer is sandwiched between a top stack and a bottom stack. The fast response force sensor responds rapidly to a force applied thereon. The SSB spacer maintains a fixed position between the top stack and the bottom stack before and after the fast response force sensor being depressed. The SSB spacer shall not significantly change its dimension before and after a force is applied against the force sensor. The SSB spacer is in a solid state and is not involved in the deformed while the fast response force sensor is depressed by a user, and therefore the fast response force sensor responds quickly to a force applied against the fast response force sensor.

The piezo material 13, 13B is a piezo-resistive material exemplified in the application. The piezo material 13, 13B is selected from a group consisting of resistive type material, electrostatic type material, and capacitive type material.

Figure 4A:
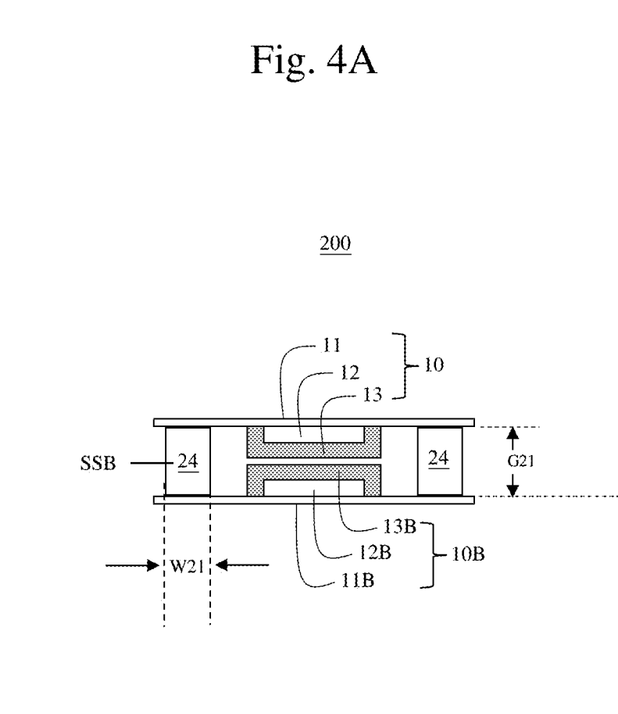
FIGS. 4A-4B and 5 show a first embodiment according to the present invention.
Figure 4B:
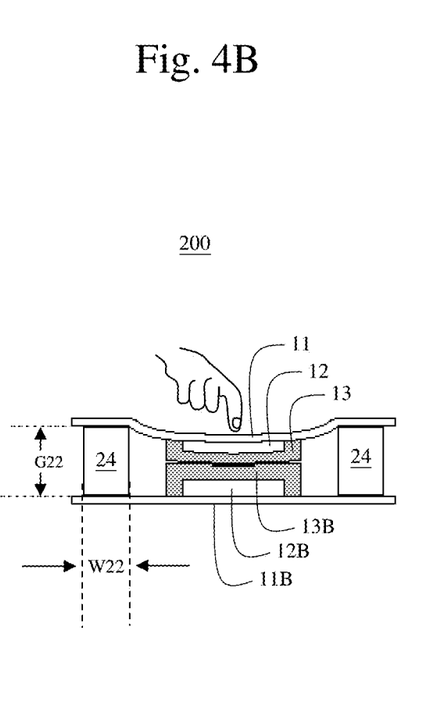
Figure 5:
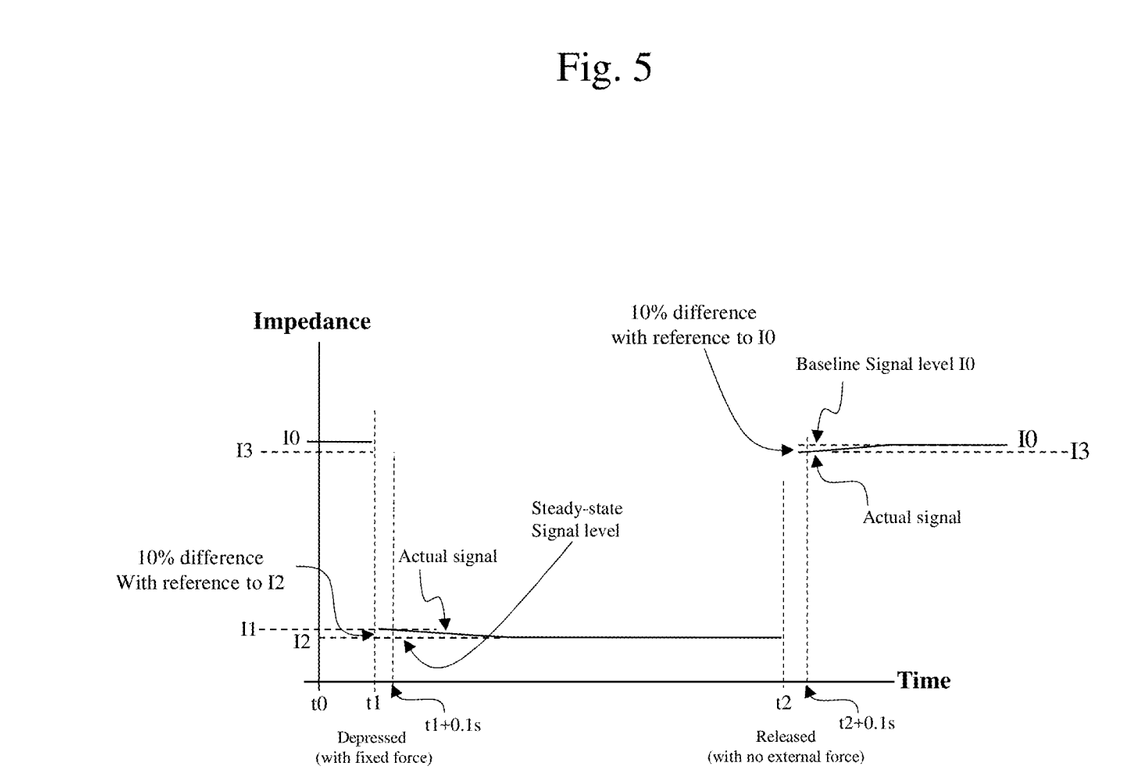

FIGS. 4A-4B and 5 show a first embodiment according to the present invention.

FIG. 4A shows the force sensor 200 in a status before being depressed.

FIG. 4A shows a force sensor 200 which comprises a top stack 10, a solid-state bonding (SSB) spacer 24, and a bottom stack 10B. The top stack further comprises a top substrate 11, a top electrode 12, and a top piezo material 13 as an example. The top electrode 12 is configured on a bottom surface of the top substrate 11, and the bottom piezo material 13 is configured on a bottom side of the bottom electrode 12.

The bottom stack comprises, similar to the top stack, a bottom substrate 11B, a bottom electrode 12B, and a bottom piezo material 13B as an example. The bottom electrode 12B is configured on a top side of the bottom substrate 11B, and the bottom piezo material 13B is configured on a top side of the bottom electrode 12B.

The SSB spacer 24 is configured between the top substrate 11 and the bottom substrate 11B to keep a fixed relative position between the top substrate 11 and the bottom substrate 11B in a baseline state while the force sensor 200 is in standby; and a control circuit (not shown) is electrically coupled to the force sensor 200 for sensing an output signal responding to a force applied against the force sensor 200. The SSB spacer 24 has a height G21 and a width W21 while the force sensor 200 is in standby.

FIG. 4B shows the force sensor 200 in a status after being depressed.

FIG. 4B shows while the force sensor 200 is depressed, SSB spacer 24 does not substantially change its dimension. In a section view, the height G22 is substantially the same as the original height G21 and the width W22 is substantially the same as the original width W21. This is because the SSB spacer is solid and therefore not flowable and not viscous. When the force sensor 200 is depressed, the SSB spacer 24 maintains a substantially fixed shape. The SSB spacer 24 does not significantly influence the deformation rate of the piezo material 13 and causes little depression signal delay. Similarly while the force sensor 200 is released, little restoration of the SSB spacer 24 is needed, and almost no restoration signal delay is caused by the spacer.

In an output vs. time graph, while the force sensor is being depressed, a stabilization time to reach an Impedance I1 within 10% of an Impedance I2 for a steady-state signal level is within one third (⅓) second after a constant external force is applied against the force sensor 200.

In an output Impedance vs. time graph, while the force sensor being released, a stabilization time to reach an Impedance I3 within 10% of an Impedance I0 for the baseline signal level is within one third (⅓) second after the external force is released from the force sensor 200.

FIG. 5 shows a graph of Impedance vs Time according to the present invention.

FIG. 5 shows an impedance I0 for a baseline signal level at time t0 for the force sensor 200 when the force sensor 200 is in standby. The force sensor 200 is depressed at time t1 with a constant force, the impedance goes down towards impedance I2 for a steady-state signal level. The actual signal drops to I1 at time t1+0.1 s where impedance I1 is within 10% of impedance I2.

The 10% difference is calculated as follows:

$$ABS(I1-I2)/I2 \leq 10\%; \text{ wherein}$$

ABS: absolute value.
I1: Impedance for actual signal.
I2: Impedance for the steady-state signal level.

The force sensor 200 is released at time t2, the impedance goes up swiftly and towards the baseline signal level I0. The actual signal goes up to I3 at time t2+0.1 s where impedance I3 is within 10% of impedance I0 for the baseline signal level.

The 10% difference is calculated as follows:

$$ABS(I0-I3)/I0 \leq 10\%; \text{ wherein}$$

ABS: absolute value.
I3: Impedance for actual signal.
I0: Impedance for the baseline signal level.

It shows a force signal responding quickly, where the response time is as small as 0.1 second before the force signal being stable.

Figure 6A:
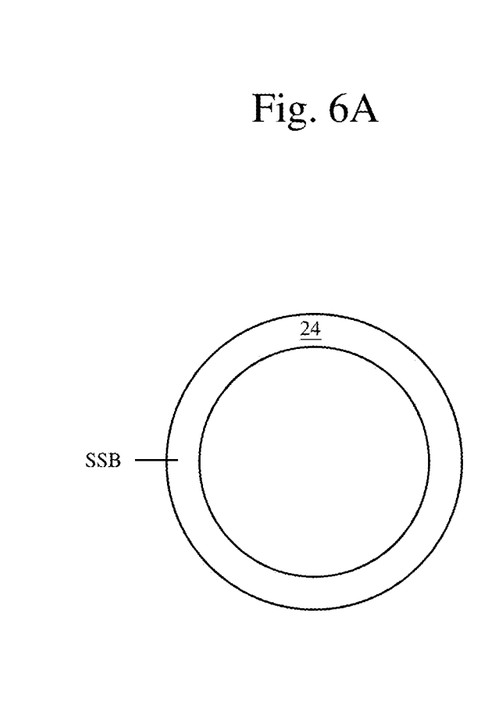
FIGS. 6A-6C show different types for the SSB spacer according to the present invention.
Figure 6B:
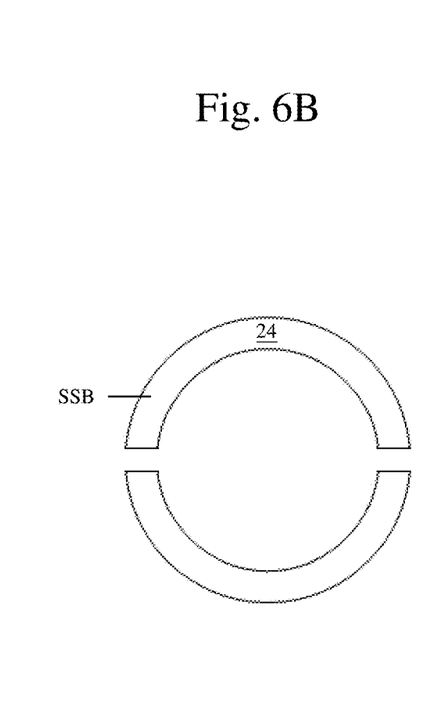
Figure 6C:
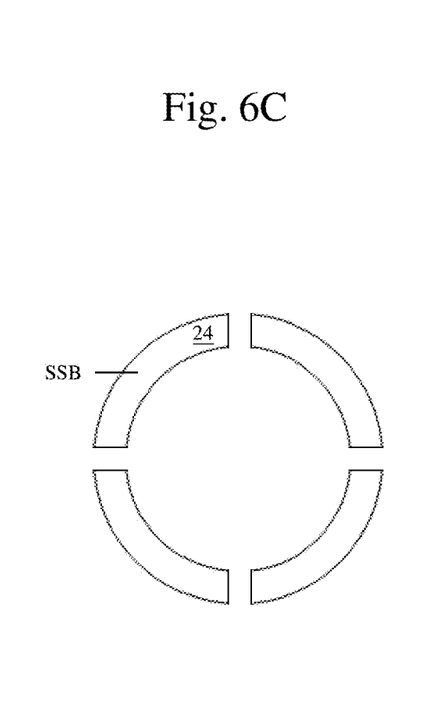

FIGS. 6A-6C show different types for the SSB spacer according to the present invention.

FIG. 6A shows the SSB spacer 24 is a circular wall in a top view of the SSB spacer 24.

FIG. 6B shows the SSB spacer 24 is a pair of a half-circular wall in a top view of the SSB spacer 24.

FIG. 6B shows the SSB spacer 24 is four of a quarter-circular wall in a top view of the SSB spacer 24.

Figure 7A:
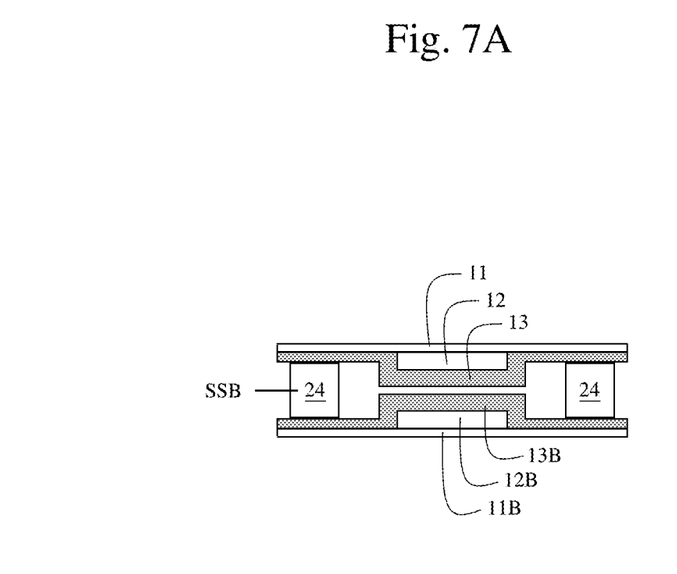
Figure 7B:
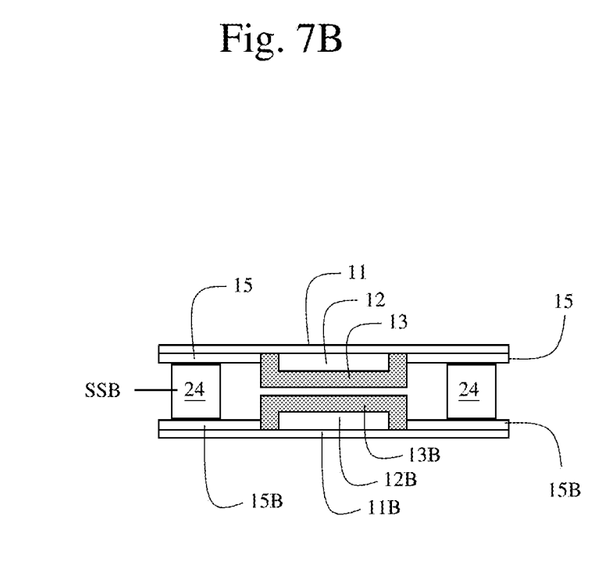
Figure 8A:
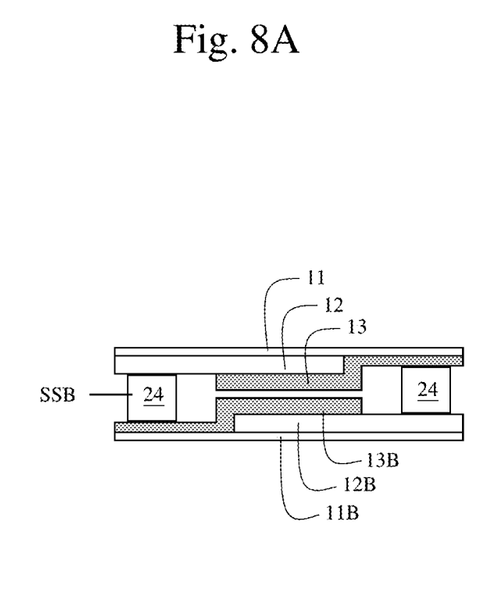
Figure 8B:
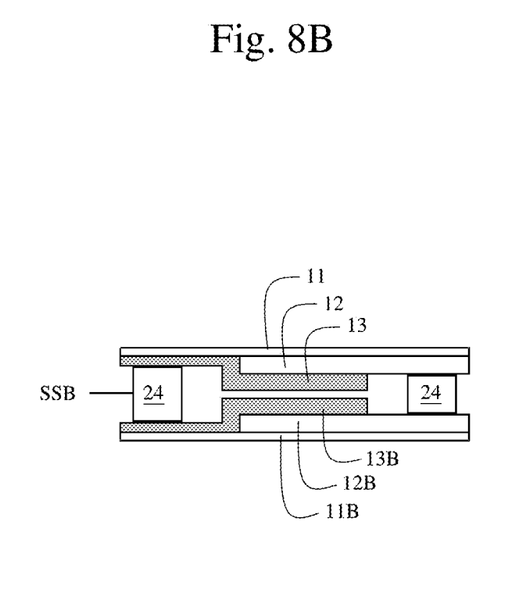

FIGS. 7A-7B and 8B show different positions for the SSB spacer according to the present invention.

FIG. 7A shows the top piezo material 13 extends laterally beyond a side edge of the top electrode 12 to cover a portion of the bottom surface of the top substrate 11, and the extended top piezo material 13 is configured between the top substrate 11 and the SSB spacer 24 so that a top end of the SSB spacer 24 connects to the top piezo material 13. Similarly, the bottom piezo material 13B extends laterally beyond a side edge of the bottom electrode 12B to cover a portion of the top surface of the bottom substrate 11B, and the extended bottom piezo material 13B is configured between the bottom substrate 11B and the SSB spacer 24 so that a bottom end of the SSB spacer 24 connects to the bottom piezo material 13B.

FIG. 7B shows the force sensor 200 further comprises a top insulation layer 15 configured in an area between the top substrate 11 and the SSB spacer 24 so that a top end of the SSB spacer 24 connects to the top insulation layer 15. Similarly, a bottom insulation layer 15B configured in an area between the bottom substrate 11B and the SSB spacer 24 so that a bottom end of the SSB spacer 24 connects to the bottom insulation layer 15B.

FIG. 8A shows the top electrode 12 of the force sensor 200 extends laterally to an area between the top substrate 11 and the SSB spacer 24 so that a top end of the SSB spacer 24 connects to the top electrode 12. The bottom piezo material 13B of the force sensor 200 extends laterally to an area between the bottom substrate 11B and the SSB spacer 24 so that a bottom end of the SSB spacer 24 connects to the bottom piezo material 13B.

In a section view, the top electrode 12 and the bottom electrode 12B extend in an opposite direction.

FIG. 8B shows a configuration similar to FIG. 8A, but the difference is, in a section view, the top electrode 12 and the bottom electrode 12B extend in a same direction so that the left SSB spacer 24 connects top piezo material 13 and bottom piezo material 13B, and the right SSB spacer 24 connects top electrode 12 and bottom electrode 12B.

The piezo material 13, 13B is a piezo-resistive material exemplified in the application only. The piezo material 13, 13B can be one material selected from a group consisting of electrostatic material, resistive material, and capacitive material.

The SSB spacer 24 is solid at room temperature and is formed through a phase-change process which transforms the spacer material from a flowable state into a solid state. The phase-change process is selected from a group consisting of: solvent evaporation for a glue, UV radiation for a UV cured adhesive, thermal curing of thermoset adhesive, and heating and cooling for hot melt adhesive.

The SSB spacer 24 usually has a cohesive strength larger than an adhesive strength at room temperature, upon mechanical separation of the bonding interface at room temperature, each of the broken surfaces remains dry without having any tacky residues.

The SSB spacer 24 has a tan δ<1 at room temperature; wherein tan δ is a loss tangent (tan δ=G"/G') for the solid-state bonding spacer;

G" is a coefficient for elastic behavior;

G' is a coefficient for viscous behavior.

Figure 9A:
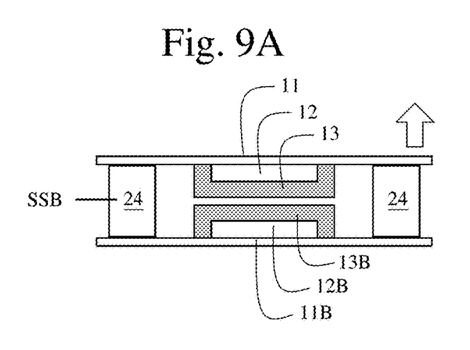
FIGS. 9A-9B show a peeling test applied on the force sensor according to the present invention.
Figure 9B:
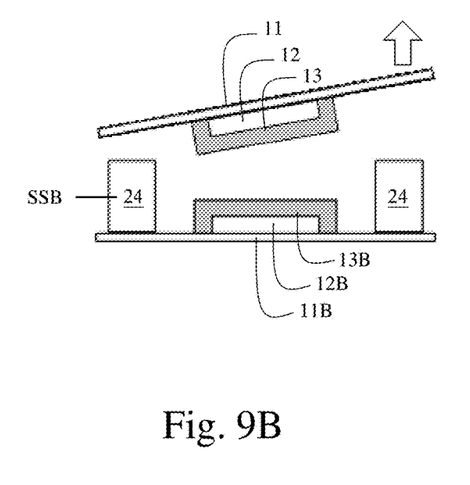

FIGS. 9A-9B show a peeling test applied on the force sensor according to the present invention FIG. 9A shows the force sensor before the peeling test.

FIG. 9A is the same as FIG. 4A which shows the force sensor 200 before peeling test being applied. A force sensor 200 is secured from bottom side and an upward peeling force is applied on the top substrate 11.

FIG. 9B shows the force sensor after the peeling test.

FIG. 9B shows when the top substrate 11 is torn apart from the SSB spacer 24, no residues of the SSB spacer 24 remain on a bottom surface of the top substrate 11 since the SSB spacer 24 is solid which has a cohesive force larger than an adhesive force. Re-bonding is irreversible at <1 kg/cm^2 at room temperature for the separation between the top substrate 11 and the SSB spacer 24.

Figure 10A:
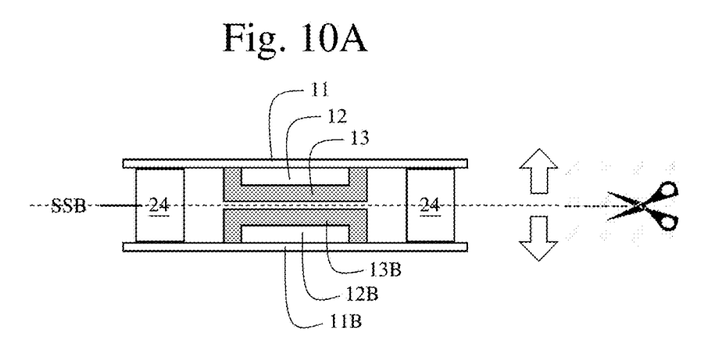
FIGS. 10A-10B show a cutting test applied on the force sensor according to the present invention.
Figure 10B:
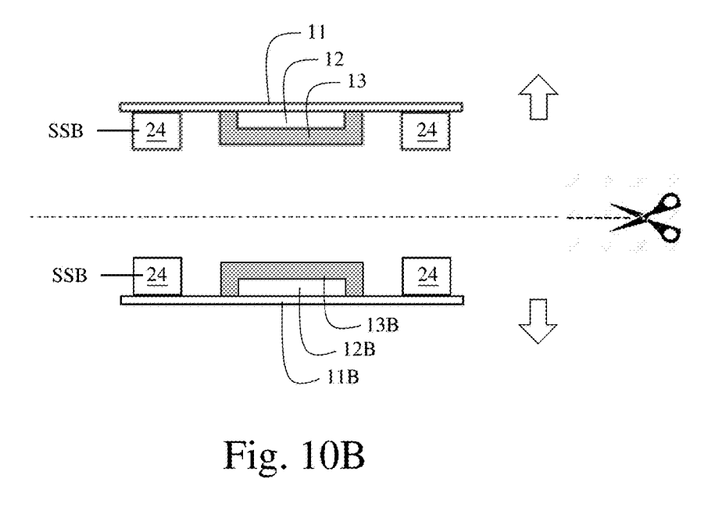

FIGS. 10A-10B show a cutting test applied on the force sensor according to the present invention.

FIG. 10A shows the force sensor before a cutting test being applied.

FIG. 10A is the same as FIG. 9A which shows the force sensor 200 before cutting is applied. A force sensor 200 is secured from bottom side and an horizontal cutting force is applied on the SSB spacer 24.

FIG. 10B shows the force sensor after the cutting test being applied.

FIG. 10B shows the SSB spacer 24 is cut and a clear cutting surface is obtained, no sticky material remained on either cutting surface of the separated SSB spacers 24.

Figure 11A:
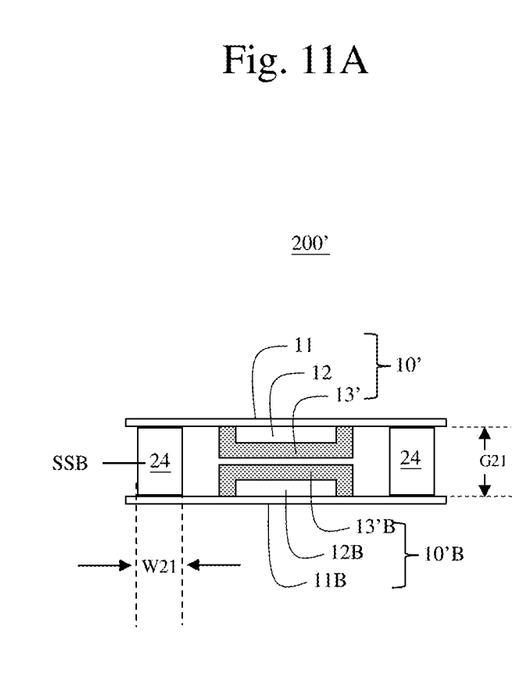
FIGS. 11A-11B show a piezo-capacitive force sensor 200' in a status before being depressed.
Figure 11B:
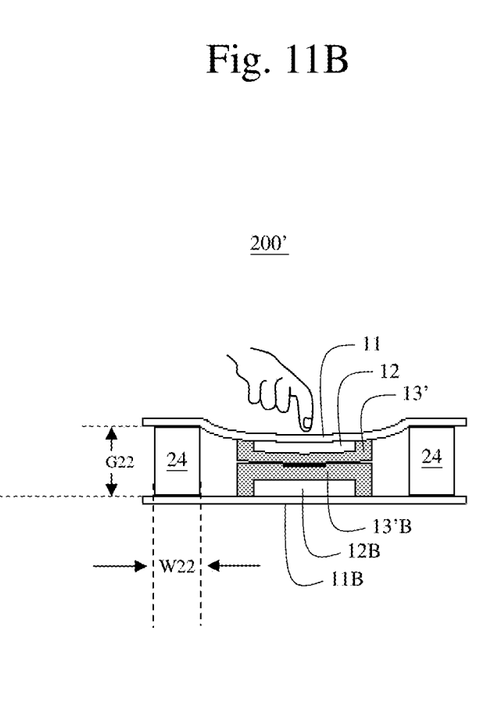

FIGS. 11A-11B show a piezo-capacitive force sensor 200' in a status before being depressed.

Like the piezo-resistive force sensor 200 designed with SSB spacer 24 as described in previous paragraph in this application, similarly, a piezo-capacitive force sensor 200' can also be designed with SSB spacer 24.

FIG. 11A shows a piezo-capacitive force sensor 200' which comprises a top stack 10', a solid-state bonding (SSB) spacer 24, and a bottom stack 10'B. The top stack further comprises a top substrate 11, a top electrode 12, and a top piezo-capacitive material 13' as an example. The top electrode 12 is configured on a bottom surface of the top substrate 11, and the bottom piezo-capacitive material 13' is configured on a bottom side of the bottom electrode 12.

The bottom stack comprises, similar to the top stack, a bottom substrate 11B, a bottom electrode 12B, and a bottom piezo-capacitive material 13'B as an example. The bottom electrode 12B is configured on a top side of the bottom substrate 11B, and the bottom piezo-capacitive material 13'B is configured on a top side of the bottom electrode 12B.

The SSB spacer 24 is configured between the top substrate 11 and the bottom substrate 11B to keep a fixed relative position between the top substrate 11 and the bottom substrate 11B in a baseline state while the piezo-capacitive force sensor 200' is in standby; and a control circuit (not shown) is electrically coupled to the force sensor 200' for sensing an output signal responding to a force applied against the piezo-capacitive force sensor 200'. The SSB spacer 24 has a height G21 and a width W21 while the force sensor 200 is in standby.

FIG. 11B shows the piezo-capacitive force sensor 200' in a status after being depressed.

FIG. 11B shows while the piezo-capacitive force sensor 200' is depressed, SSB spacer 24 does not substantially change its dimension. In a section view, the height G22 is substantially the same as the original height G21 and the width W22 is substantially the same as the original width W21. This is because the SSB spacer 24 is solid and therefore not flowable and not viscous. When the piezo-capacitive force sensor 200' is depressed, the SSB spacer 24 maintains a substantially fixed shape. The SSB spacer 24 does not significantly influence the deformation rate of the piezo-capacitive material 13' and causes no depression signal delay. Similarly, while the piezo-capacitive force sensor 200' is released, very little restoration of the SSB spacer 24 is needed, and little restoration signal delay is caused by the SSB spacer 24.

In an output vs. time graph, while the piezo-capacitive force sensor is being depressed, a stabilization time to reach a Capacitance C1 within 10% of a Capacitance C2 for a steady-state signal level is within one third (⅓) second after a constant external force is applied against the force sensor 200.

In an output Capacitance vs. time graph, while the piezo-capacitive force sensor being released, a stabilization time to reach a Capacitance C3 within 10% of a Capacitance C0 for the baseline signal level is within one third (⅓) second after the external force is released from the piezo-capacitive force sensor 200'.

Figure 12:
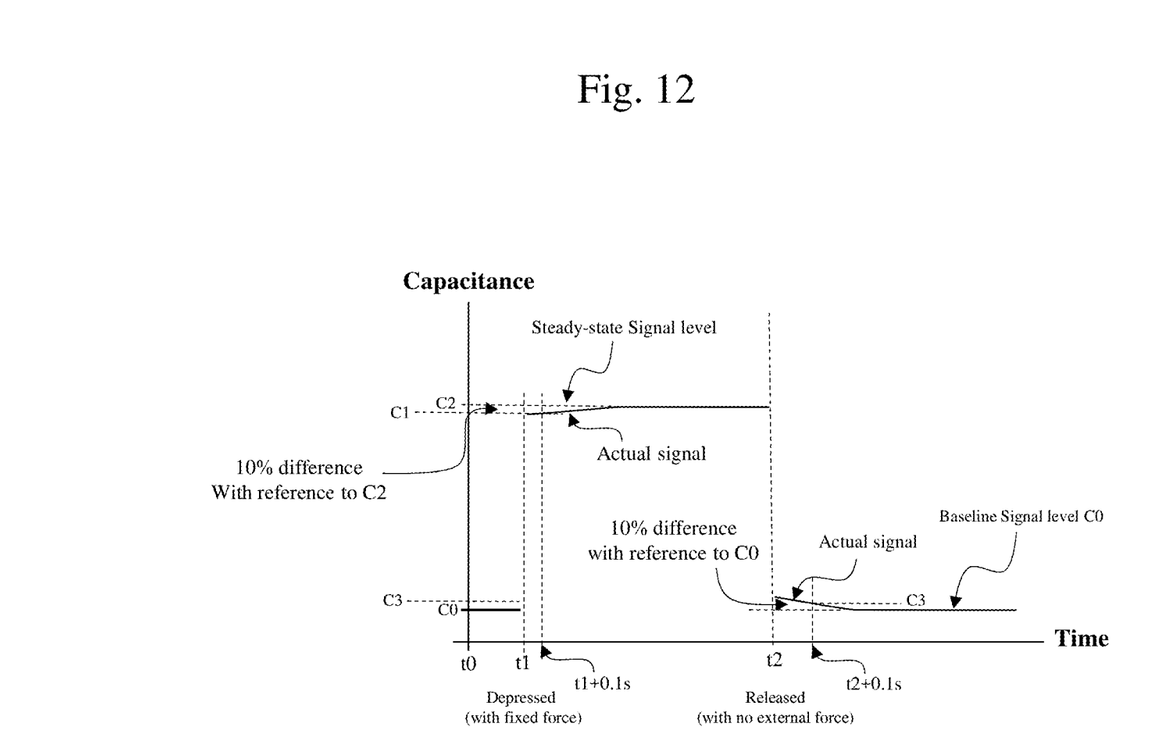
FIG. 12 shows a graph of Capacitance vs Time according to the present invention.

FIG. 12 shows a graph of Capacitance vs Time according to the present invention.

FIG. 12 shows a Capacitance C0 for a baseline signal level at time t0 for the force sensor 200 when the force sensor 200 is in standby. The piezo-capacitive force sensor 200' is depressed at time t1 with a constant force, the Capacitance goes up towards Capacitance C2 for a steady-state signal level. The actual signal climbs to C1 at time t1+0.1 s where Capacitance C1 is within 10% of Capacitance C2.

The 10% difference is calculated as follows:

$$ABS(C1-C2)/C2 \leq 10\%; \text{ wherein}$$

ABS: absolute value.

C1: Capacitance for actual signal.

C2: Capacitance for the steady-state signal level.

The piezo-capacitive force sensor 200' is released at time t2, the capacitance goes down swiftly and towards the baseline signal level C0. The actual signal goes down to C3 at time t2+0.1 s where Capacitance C3 is within 10% of Capacitance C0 for the baseline signal level.

The 10% difference is calculated as follows:

$$ABS(C0-C3)/C0 \leq 10\%; \text{ wherein}$$

ABS: absolute value.

C3: Capacitance for actual signal.

C0: Capacitance for the baseline signal level.

It shows a force signal responding quickly, where the response time is as small as 0.1 second before the force signal being stable.

While several embodiments have been described by way of example, it will be apparent to those skilled in the art that various modifications may be configured without departs from the spirit of the present invention. Such modifications are all within the scope of the present invention, as defined by the appended claims.

| Numerical system | |
|---|---|
| 10, 10' | top stack |
| 100 | force sensor |
| 10B, 10'B | top stack |

-continued

| Numerical system | |
|---|---|
| 11 | top substrate |
| 11B | bottom substrate |
| 12 | top electrode |
| 12B | bottom electrode |
| 13 | top piezo material |
| 13' | top piezo-capacitive material |
| 13'B | bottom piezo-capacitive material |
| 13B | bottom piezo material |
| 14 | PSA spacer |
| 141 | residues |
| 15 | top insulation layer |
| 15B | bottom insulation layer |
| 200 | force sensor |
| 200' | piezo-capacitive force sensor |
| 24 SSB | spacer |
| G21, G22 | height |
| W21, W22 | width |

What is claimed is:

1. A force sensor, comprising:
a top stack comprising:
  a top substrate,
  a top electrode, and
  a top piezo material,
a bottom stack arranged under the top stack in a thickness direction of the force sensor, the bottom stack comprising:
  a bottom substrate,
  a bottom electrode, and
  a bottom piezo material; and
a solid-state bonding spacer sandwiched, in the thickness direction of the force sensor, between the top substrate and the bottom substrate and keeping a fixed relative position between the top substrate and the bottom substrate in a baseline state,
wherein
the top piezo material has a first top extension extending laterally beyond a side edge of the top electrode to cover a portion of a bottom surface of the top substrate, and
the first top extension of the top piezo material is sandwiched, in the thickness direction of the force sensor, between the bottom surface of the top substrate and a top surface of the solid-state bonding spacer so that the top surface of the solid-state bonding spacer is connected to the first top extension of the top piezo material.

2. The force sensor as claimed in claim 1, wherein
in an output vs. time graph, a stabilization time to reach within 10% of a steady-state signal level is within one third second after a constant external force is applied against the force sensor, and
in the output vs. time graph, a stabilization time to reach within 10% of a baseline signal level is within one third second, after the external force is released from the force sensor.

3. The force sensor as claimed in claim 1, wherein
the top surface of the solid-state bonding spacer is directly connected to a bottom surface of the first top extension of the top piezo material.

4. The force sensor as claimed in claim 1, wherein
the top piezo material further has a second top extension extending laterally away from the first top extension and beyond a further side edge of the top electrode to cover a further portion of the bottom surface of the top substrate, and the second top extension of the top piezo material is sandwiched, in the thickness direction of the force sensor, between the top substrate and the top surface of the solid-state bonding spacer so that the top surface of the solid-state bonding spacer is connected to the second top extension of the top piezo material.

5. The force sensor as claimed in claim 4, wherein
the top electrode is sandwiched, in the thickness direction of the force sensor, between the bottom surface of the top substrate and the top piezo material, and
the top electrode is enclosed by the top piezo material.

6. The force sensor as claimed in claim 4, wherein
the top surface of the solid-state bonding spacer is directly connected to bottom surfaces of the first and second extensions of the top piezo material.

7. The force sensor as claimed in claim 4, wherein
the bottom piezo material has a first bottom extension extending laterally in a same direction as the first top extension of the top piezo material, and beyond a side edge of the bottom electrode to cover a portion of a top surface of the bottom substrate,
the bottom piezo material further has a second bottom extension extending laterally in a same direction as the second top extension of the top piezo material, and beyond a further side edge of the bottom electrode to cover a further portion of the top surface of the bottom substrate,
the first and second bottom extensions of the bottom piezo material are sandwiched, in the thickness direction of the force sensor, between the top surface of the bottom substrate and a bottom surface of the solid-state bonding spacer, and
the solid-state bonding spacer is sandwiched, in the thickness direction of the force sensor, between the first top and bottom extensions, and between the second top and bottom extensions.

8. The force sensor as claimed in claim 7, wherein
the top surface of the solid-state bonding spacer is directly connected to bottom surfaces of the first and second top extensions of the top piezo material, and
the bottom surface of the solid-state bonding spacer is directly connected to top surfaces of the first and second bottom extensions of the bottom piezo material.

9. The force sensor as claimed in claim 1, further comprising
a top insulation layer sandwiched, in the thickness direction of the force sensor, between the top substrate and the solid-state bonding spacer so that the top surface of the solid-state bonding spacer is connected to a bottom surface of the top insulation layer.

10. The force sensor as claimed in claim 1, wherein
the bottom piezo material further has a first bottom extension extending laterally away from the first top extension of the top piezo material, and beyond a side edge of the bottom electrode to cover a portion of a top surface of the bottom substrate, and
the first bottom extension of the bottom piezo material is sandwiched, in the thickness direction of the force sensor, between the bottom substrate and a bottom surface of the solid-state bonding spacer so that the bottom surface of the solid-state bonding spacer is connected to the first bottom extension of the bottom piezo material.

11. The force sensor as claimed in claim 10, wherein
the top electrode extending laterally away from the first top extension of the top piezo material and in a same direction as the first bottom extension of the bottom piezo material, so that the solid-state bonding spacer is sandwiched, in the thickness direction of the force sensor, between the first bottom extension and the top electrode.

12. The force sensor as claimed in claim 11, wherein the bottom electrode extending laterally away from the first bottom extension of the bottom piezo material and in a same direction as the first top extension of the top piezo material so that the solid-state bonding spacer is sandwiched, in the thickness direction of the force sensor, between the first top extension and the bottom electrode.

13. The force sensor as claimed in claim 1, wherein the bottom piezo material further has a first bottom extension extending laterally in a same direction as the first top extension of the top piezo material, and beyond a side edge of the bottom electrode to cover a portion of a top surface of the bottom substrate, and
the first bottom extension of the bottom piezo material is sandwiched, in the thickness direction of the force sensor, between the bottom substrate and a bottom surface of the solid-state bonding spacer so that
the bottom surface of the solid-state bonding spacer is connected to the first bottom extension of the bottom piezo material, and
the solid-state bonding spacer is sandwiched, in the thickness direction of the force sensor, between the first top extension and the first bottom extension.

14. The force sensor as claimed in claim 13, wherein the top electrode extending laterally away from the first top extension of the top piezo material and the bottom electrode extending laterally away from the first bottom extension of the bottom piezo material, so that the solid-state bonding spacer is sandwiched, in the thickness direction of the force sensor, between the bottom electrode and the top electrode.

15. The force sensor as claimed in claim 1, wherein the solid-state bonding spacer has a shape, in a top view, selected from the group consisting of: circular wall, half-circular wall, and quarter-circular wall.

16. The force sensor as claimed in claim 1, the piezo material is selected from the group consisting of piezoresistive material, piezo-electrostatic material, and piezocapacitive material.

17. A force sensor, comprising:
a top stack comprising a top substrate on a top side of the top stack;
a bottom stack comprising a bottom substrate on a bottom side of the bottom stack; and
a solid-state bonding spacer configured between the top substrate and the bottom substrate and keeping a fixed relative position between the top substrate and the bottom substrate in a baseline state,
wherein the solid-state bonding spacer is solidified adhesive that does not substantially change a dimension thereof when the force sensor is depressed, such that
in an output vs. time graph, a stabilization time to reach within 10% of a steady-state signal level is within one third second after a constant external force is applied to depress the force sensor, and
in the output vs. time graph, a stabilization time to reach within 10% of a baseline signal level is within one third second, after the external force is released from the force sensor.

18. The force sensor as claimed in claim 17, wherein the solidified adhesive is selected from the group consisting of:
thermally cured thermoset adhesive,
moist-cured thermoset adhesive,
thermoset adhesive solidified through solvent evaporation,
UV cured thermoset adhesive, and
thermoplastic adhesive solidified through heating and cooling.

19. The force sensor as claimed in claim 18, wherein:
the solidified adhesive is thermally cured thermoset adhesive selected from the group consisting of Epoxies, Acrylics, Urethanes, Anaerobics, Phenolics, Vinyl acetates, Silicones, and derivatives.

20. The force sensor as claimed in claim 18, wherein:
the solidified adhesive is moist-cured thermoset adhesive selected from the group consisting of Cyanoacrylates, Epoxies, Acrylics, Anaerobics, Silicones, and derivatives.

21. The force sensor as claimed in claim 18, wherein:
the solidified adhesive is thermoset adhesive solidified through solvent evaporation and selected from the group consisting of Epoxies, Acrylics, Urethanes, Anaerobics, Phenolics, Vinyl acetates, Silicones, and derivatives.

22. The force sensor as claimed in claim 18, wherein:
the solidified adhesive is UV cured thermoset adhesive selected from the group consisting of Epoxies, Acrylics, Urethanes, Anaerobics, Phenolics, Vinyl acetates, Silicones, and derivatives.

23. The force sensor as claimed in claim 18, wherein:
the solidified adhesive is thermoplastic adhesive solidified through heating and cooling and selected from the group consisting of Urethane, Amide, Ethylene, Vinyl Acetate, and derivatives.

24. The force sensor as claimed in claim 17, wherein:
the solid-state bonding spacer has a cohesive strength larger than an adhesive strength at room temperature.

25. A force sensor, comprising:
a top stack comprising:
a top substrate on a top side of the top stack,
a top piezo material below the top substrate, and
a top electrode sandwiched between the top substrate and the top piezo material;
a bottom stack comprising:
a bottom substrate on a bottom side of the bottom stack,
a bottom piezo material above the bottom substrate, and
a bottom electrode sandwiched between the bottom substrate and the bottom piezo material;
a solid-state bonding spacer configured between the top substrate and the bottom substrate and keeping a fixed relative position between the top substrate and the bottom substrate in a baseline state; and
a control circuit electrically coupled to the force sensor for sensing an output signal responding to a force applied against the force sensor,
wherein:
the solid-state bonding spacer has a cohesive strength larger than an adhesive strength at room temperature, and
the solid-state bonding spacer is solid at room temperature, and does not substantially change a dimension thereof when the force sensor is depressed, such that
in an output vs. time graph, a stabilization time for the output signal to reach within 10% of a steady-state signal level is within one third second after a constant external force is applied to depress the force sensor, and in the output vs. time graph, a stabilization time for the output signal to reach within 10% of a baseline signal level is within one third second, after the external force is released from the force sensor.

26. The force sensor as claimed in claim 25, wherein:
upon mechanical separation of the bonding interface at room temperature, each of the broken surfaces remains dry without having any tacky residues.

27. The force sensor as claimed in claim 25 wherein:
the solid-state bonding spacer has $\tan \delta < 1$ at room temperature, wherein
$\tan \delta$ is a loss tangent ($\tan \delta = G''/G'$) for the solid-state bonding spacer,
$G''$ is a coefficient for elastic behavior, and
$G'$ is a coefficient for viscous behavior.

28. The force sensor as claimed in claim 25, wherein:
upon a mechanical peeling or de-bonding at the bonding interface or within the solid-state bonding spacer, the separation is irreversible at $<1$ kg/cm^2 at room temperature.

* * * * *